United States Patent [19]

Otobe et al.

[11] 4,142,210

[45] Feb. 27, 1979

[54] ROTATABLE RECORD CARRIER AND METHOD AND APPARATUS FOR PRODUCING SAME

[75] Inventors: Takashi Otobe; Chiaki Kojima, both of Yokohama; Hiroshi Ohki, Tokyo, all of Japan

[73] Assignee: Sony Corporation, Tokyo, Japan

[21] Appl. No.: 851,304

[22] Filed: Nov. 14, 1977

[30] Foreign Application Priority Data

Nov. 18, 1976 [JP] Japan .................. 51-138821

[51] Int. Cl.² ............................................. G11B 7/00
[52] U.S. Cl. .......................... 358/128; 179/100.3 V; 346/76 L; 346/137; 365/215
[58] Field of Search .............. 358/128; 179/100.3 V, 179/100.4 C, 100.4 D; 365/215; 346/76 L, 108, 137

[56] References Cited

U.S. PATENT DOCUMENTS

| 3,423,524 | 1/1969 | Bradford | 179/100.3 V |
|---|---|---|---|
| 3,646,259 | 2/1972 | Schuller | 179/100.4 D |
| 3,906,152 | 9/1975 | Hoogendijk | 358/128 |

FOREIGN PATENT DOCUMENTS

2429850  1/1975  Fed. Rep. of Germany ........... 358/128
1479294  7/1977  United Kingdom ..................... 358/128

Primary Examiner—Daryl W. Cook
Assistant Examiner—Donald McElheny, Jr.
Attorney, Agent, or Firm—Lewis H. Eslinger; Alvin Sinderbrand

[57] ABSTRACT

A rotatable record carrier upon which reproducible information is recorded in the form of spaced apart pits in substantially concentric circular tracks on a surface of the carrier. A method of producing this record carrier is disclosed wherein, although the linear velocity of each track is dependent upon the radius of the track, the length of the pits in the respective tracks does not vary as a function of the change in the radius from one track to the next. A light beam is modulated with a rectangular pulse information signal, the duration of each pulse being controlled as a function of the radius of the track which is being scanned by the modulated light beam. For tracks having a smaller radius, the pulse duration is made larger than for tracks having a larger radius. When the record carrier of this invention is used for optically reproducing the recorded information signals, a proper relationship between the size of the scanning beam spot and the length of the recorded pits can be maintained merely by retaining a substantially constant beam spot.

20 Claims, 17 Drawing Figures

ROTATABLE RECORD CARRIER AND METHOD AND APPARATUS FOR PRODUCING SAME

BACKGROUND OF THE INVENTION

This invention relates to a record carrier upon which optically reproducible information is recorded and, more particularly, to such a carrier wherein information is represented by spaced apart pits which are recorded in substantially concentric circular tracks on the carrier, and to a method and apparatus for producing same.

Recently, various techniques have been proposed for recording information on a record carrier with a relatively high recording density and for reproducing such information therefrom. As an example, video information is recorded in spiral or substantially concentric circular tracks on a rotatable record disc. In one such proposal, the recorded video information is optically reproduced from a rotating record disc. This is achieved by recording the information in the form of optically detectable pits in the substantially circular tracks on the disc. In a reproducing operation, successive tracks are scanned by a light beam, and the intensity of the beam which either is reflected from the surface of the disc or is transmitted through the disc is modulated by the recorded pits.

A high recording density is preferred, especially when video information is recorded, in order to provide a record disc of relatively long playing time. As an example, if one frame of video information is recorded in each track, then, for the NTSC system, thirty frames per second must be reproduced, thereby requiring an angular velocity of the disc of 1800 rpm. This means that 1800 tracks are scanned each minute, thereby requiring an extremely small track width to permit a sufficient number of frames to be recorded so that a reasonable playing time for the disc is established. Since each pit represents a quantum of video information in a frame, the length and spacing of the pits must be carefully selected to enable a frame of information to be recorded in each track.

In one technique for recording video information in the form of pits in concentric tracks, the video signal is frequency modulated and the pits represent such frequency modulations. More particularly, in this prior art technique, a clipping level is established and the frequency modulated video signal is compared to this clipping level. The duration of the frequency modulated video signal which exceeds the clipping level is recorded in the form of a pit such that the length of this pit is proportional to that portion of the frequency modulated video signal which exceeds the clipping level. As the frequency component of the frequency modulated signal increases, the length of the pit decreases. Conversely, as the frequency component of the frequency modulated video signal decreases, the pit length increases.

In addition to varying in accordance with the frequency component of the frequency modulated signal, the length of a pit also is dependent upon the radius of the track in which it is recorded. This is appreciated by assuming that the same frequency component is recorded in a track whose radius is, for example, 15 cm. and a track whose radius is, for example, 5 cm. In both cases, the duration of the frequency modulated video signal which exceeds the clipping level is identical. However, the linear speed of the track whose radius is 15 cm. is three times greater than the linear speed of the track whose radius is 5 cm. Since the length of a recorded pit is proportional to the duration of that portion of the frequency modulated video signal which exceeds the clipping level multiplied by the linear velocity of the track, the length of the pit recorded in the track whose radius is 15 cm. is three times as long as the pit which is recorded in the track whose radius is 5 cm.

In view of this dependence of the pit length upon the radius of the track in which it is recorded, errors may be introduced during signal reproduction because the relationship between the length of a pit and the size of the scanning beam spot varies. For example, let it be assumed that the size of the scanning beam spot remains constant for the scanning of all tracks regardless of the radius of the particular track which is being scanned. Let it be further assumed that the recorded pits are detected by sensing the intensity of light which is reflected from the surface of the disc as the beam scans the track. Then, in the absence of a pit, that is, in the space between adjacent pits, the intensity of the reflected light is of one level and the intensity of the light which is reflected when the beam spot scans a pit is of another level. A pit is effectively detected when a portion of the scanning beam spot impinges thereon. Hence, if the length of a pit recorded in a track whose radius is, for example, 15 cm. is represented $L_1$, and if the diameter of the scanning beam spot is represented as r, then the pit will be detected when the beam first impinges upon the leading edge of the pit and this detected condition will be maintained while the beam overlaps the pit and until the beam no longer impinges upon the trailing edge of the pit. Hence, the effective detected length of the pit is equal to $L_1+2r$. This also holds true when the beam of constant diameter r scans the pit of length $L_2$ which is recorded in the track whose radius is 5 cm. Hence, in this latter case, the effective detected length of the pit is equal to $L_2+2r$. If the pits in these respective tracks represent the identical frequency component, then the length of each pit insofar as its length is determined by the frequency component is equal. However, since the pit of length $L_1$ is recorded in a track whose radius is three times the radius of the track in which the pit of length $L_2$ is recorded, then $L_1=3L_2$, in accordance with the aforementioned radial dependency of pit length. Also, the linear velocity of the track whose radius is 15 cm. may be represented as $v_1$ and the linear velocity of the track whose radius is 5 cm. may be represented as $v_2$. Again, because the larger radius is three times as great as the smaller radius, $v_1=3v_2$. Now, if a pulse is produced when the effective length of a pit is detected, then a pulse of duration $t_1$ is produced when the pit which is recorded in the track whose radius is 15 cm. may be expressed as $$t_1 = \frac{L_1 + 2r}{v_1},$$

and the duration $t_2$ of the pulse which is produced when the pit recorded in the track whose radius is 5 cm. is detected may be expressed as $$t_2 = \frac{L_2 + 2r}{v_2}.$$

The expression for $t_1$ may be rewritten as $$t_1 = \frac{3L_2 + 2r}{3v_2} = \frac{L_2 + \frac{2}{3}r}{v_2}.$$

Since both pits have been assumed as being representative of the same frequency component, it is expected that $t_1 = t_2$. However, as is clear from the foregoing, $t_1 < t_2$. This discrepancy is interpreted as a recording of different frequency components in the respective tracks. Thus, it is seen that because of the radial dependency of pit length, erroneous output signals can be reproduced from the record disc.

In the foregoing description, it was assumed that the size of the beam spot is maintained constant for all tracks notwithstanding the change in the radius from one track to the next. If the beam spot size changes in direct proportion with a change in the radius from one track to the next, it is possible that the errors described above may be minimized. However, complex and expensive apparatus is needed to control the size of the scanning beam spot as a function of the radius of the track being scanned. Because of this, it is preferred to maintain a constant beam spot size irrespective of the track radius. Consequently, a compromise generally is made between the length of a pit and the size of the beam spot. This compromise is complicated by the fact that not only does the length of the pit vary with the radius of the track, but the length of the pit also varies as a function of the frequency component of the frequency modulated video signal. Thus, although an optimum relationship between the pit length and the beam spot size can be established for a particular frequency component, this relationship might be less than satisfactory for a different frequency component which is represented by a pit of another length recorded in the very same track.

The changing relation between the length of a pit and the size of the scanning beam spot may result in still further difficulties. For a proper relation, that is, where the size of the scanning beam spot is neither too large nor too small for the pits being scanned, a pit will be detected by a change in the intensity of the light reflected therefrom, such as a reduction in the intensity of the reflected light when the beam spot impinges upon the pit. A typical output signal which is produced when the pit is detected is a negative-going pulse. However, if the length of the pit is too long relative to the size of the scanning beam spot, then the intensity of the light reflected from the surface of the record disc is reduced at the leading edge of the pit but then returns to its "normal" level as the beam scans the bottom of the pit. This is because the bottom of the pit is reflective substantially to the same degree as the surface of the disc. However, when the beam spot impinges upon the trailing edge of the pit, another reduction in the intensity of the reflected light is produced. Consequently, the output signal produced by the scanning of this pit whose length is too long relative to the size of the beam spot is provided with two negative-going pulses. Since a pit is assumed to be represented by a signal negative-going pulse, this elongated pit may be erroneously interpreted as two successive pits. Thus, an erroneous frequency component will be reproduced, thereby resulting in the reproduction of a degraded video picture.

In the foregoing assumption, the relationship between the length of a pit and the size of the scanning beam spot has been selected to be correct for pits of relatively small length, that is, for those pits which are recorded in tracks having a smaller radius. If the relationship is selected to be proper for those pits which are recorded in tracks having a larger radius, then those pits which are of relatively smaller length, that is, those pits which are recorded in tracks having a smaller radius, might not be detected. This is because the size of the scanning beam spot is too large when compared to the lengths of the pits which are recorded on those tracks having smaller radii. When such small pits are scanned, a substantial portion of the beam spot impinges upon the surrounding land, or surface of the disc. As a result, the intensity of the light reflected therefrom is changed only insignificantly by the scanned pit. To best appreciate this problem, let it be assumed that the intensity of the light which is reflected from the disc when the scanning beam impinges upon the land or surface thereof is represented as M, and the intensity of the light which is reflected when the scanning beam impinges upon the pit is represented as P, then the modulation factor m may be defined as $m = M - P/M + P$. If, as just mentioned, the size of the scanning beam spot is too large relative to the length of the pit being scanned, then the reflected light intensity P is almost equal to M. This means that the modulation factor m is very small. Hence, the signal-to-noise ratio (S/N) for a large beam spot compared to the length of a pit is small, and a deteriorated video picture signal may be reproduced. As a further disadvantage of using a beam spot which is too large relative to the length of a pit, the scanning beam spot may be so large as to impinge upon adjacent pits which are recorded either in the same or adjacent tracks. This introduces crosstalk, interference and further deterioration in the video signal which is reproduced from the disc.

OBJECTS OF THE INVENTION

Therefore, it is an object of the present invention to provide an improved record carrier which avoids the aforenoted problems attending prior art record carriers.

Another object of this invention is to provide a method of and apparatus for producing such an improved record carrier.

A further object of this invention is to provide a record carrier upon which information is recorded in the form of pits in substantially concentric circular tracks wherein the recorded information can be optically reproduced easily and accurately.

An additional object of this invention is to provide an improved record carrier and a method and apparatus for producing same wherein reproducible information is recorded as pits in substantially concentric circular tracks and wherein the length of the pits which are recorded in different tracks are prevented from varying as a function of the change in the radius from one track to the next during recording.

Yet another object of this invention is to provide a record disc and a method and apparatus for producing same wherein information, such as video information, is recorded as pits in substantially concentric circular tracks such that during a signal reproduction operation, a proper relation between the length of each pit and the size of the light beam spot which is used for reproduction can be obtained merely by maintaining a constant beam spot size for all tracks, notwithstanding the radius of each track, thereby avoiding erroneous and/or degraded reproduced output signals.

A still further object of this invention is to provide an improved record carrier and a method and apparatus for recording information thereon, wherein information is recorded in the form of pits in substantially concentric circular tracks wherein the length of each pit is maintained constant relative to the radius of the track despite the change in the radius from one track to the next during a recording operation, and wherein the recorded information is represented by the spacing between such pits.

Various other objects, advantages and features of the present invention will become readily apparent from the ensuing detailed description, and the novel features will be particularly pointed out in the appended claims.

SUMMARY OF THE INVENTION

In accordance with this invention, a rotatable record carrier has reproducible information recorded thereon in the form of spaced apart pits which are contained in substantially concentric circular tracks, all of the pits having substantially the same length relative to the radii of the tracks despite the change in the radius from one track to the next. This invention also embodies a method of recording such information on the record carrier by modulating a beam of light with an information signal. In a preferred embodiment, the information signal is a rectangular pulse signal; and in one example, the spacing between successive pulses represents information, such as video information. The instant invention also includes apparatus for carrying out the aforementioned method for recording information on the rotatable record carrier.

By preventing the length of the pits in different tracks from varying as a function of the change in the radius from one track to the next, such pits can be accurately detected and the recorded information properly reproduced merely by maintaining a constant size in the scanning beam which is used to reproduce the information, whereby the relationship between the size of the beam spot and the length of the pits is assured from track to track.

BRIEF DESCRIPTION OF THE DRAWINGS

The following detailed description, given by way of example, will best be understood in conjunction with the accompanying drawings in which.

DETAILED DESCRIPTION OF A CERTAIN PREFERRED EMBODIMENT

Figure 1A:
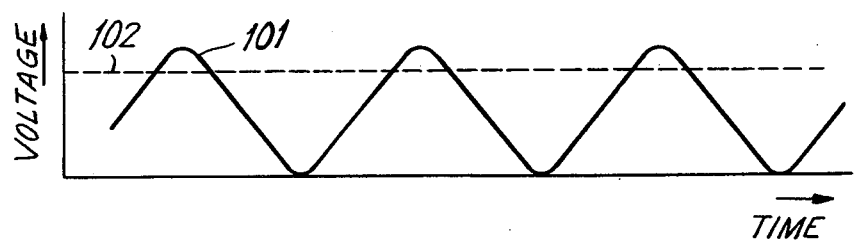
FIGS. 1A and 1B represent one technique in which signal information is recorded in the form of pits on, for example, a record disc.
Figure 1B:
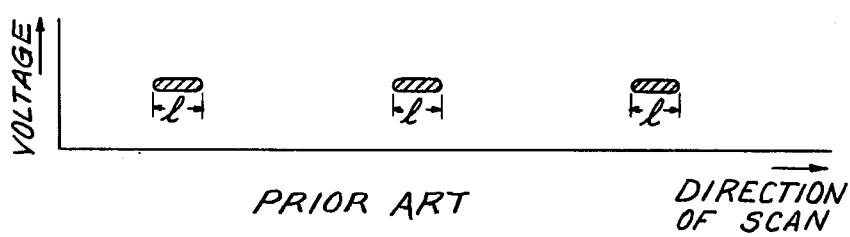

Referring now to the drawings, and in particular to FIG. 1, an example of a prior art signal recording technique is illustrated. FIG. 1A represents an information signal waveform 101 which, for example, may be a frequency modulated video signal. This information signal is compared to a clipping level 102 and those portions, or peaks, of information signal 101 which exceed clipping level 102 are recorded as pits of length 1 corresponding to the duration of the information signal which extends between successive clipping level excursions. Thus, as shown in FIG. 1B, the length 1 of a pit is dependent upon the frequency of information signal 101. Also, the spacing between adjacent pits likewise is dependent upon the frequency of the information signal.

It is recalled that the length 1 of a pit not only is dependent upon the frequency of information signal 101 but, even more so, is dependent upon the radius of the track in which the pit is recorded. Thus, for the same frequency of information signal, a longer pit will be recorded in an outer track, that is, a circular track having a greater radius, than is recorded in an inner track on a rotatable record disc.

Figure 2A:
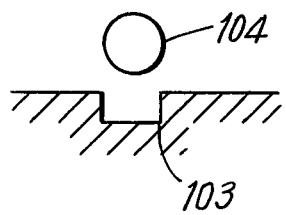
FIGS. 2A-2D are illustrative of the problem caused by a change in the relationship between the size of a scanning beam spot and the length of a pit during a signal reproducing operation.
Figure 2C:
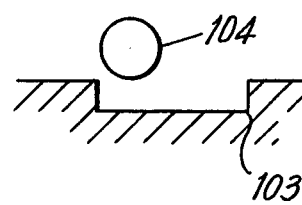
Figure 2B:
Figure 2D:

Let it be assumed that a recorded pit 103 has the length represented in FIG. 2A. If this pit is scanned by a scanning beam of spot size 104, and if the relation between the size of beam spot 104 and the length of pit 103 is assumed to be proper, then the scanning of pit 103 by beam spot 104 will result in a negative-going pulse, as shown in FIG. 2B. However, if pit 103 is recorded in, for example, an inner track, then, for the very same frequency component, a pit 103 having the length shown in FIG. 2C, will be recorded in an outer track. If the very same beam spot 104 is used to scan pit 103 in FIG. 2C, the resultant output signal which is produced when pit 103 is detected is as shown in FIG. 2D. Although the single negative-going pulse shown in FIG. 2B is correct, it is appreciated that, because the length of pit 103 is expanded in the outer track, the output signal which is produced by scanning this pit is provided with two negative-going pulses, as shown in FIG. 2D. However, if the signal processing circuitry, which is provided to respond to the signals representing detected pits, is responsive to signals such as the signals shown in FIG. 2B, then an erroneous operation is performed upon the signals shown in FIG. 2D. That is, in the latter case, the signal processing circuitry will erroneously interpret the signals shown in FIG. 2D as representing the detection of two pits. It is seen that the signals shown in FIG. 2D are produced when the length of a pit, such as pit 103, is too long for the size of a beam spot, such as beam spot 104. That is, for the relationship shown in FIG. 2C, negative-going pulses, as shown in FIG. 2D, are produced when beam spot 104 detects the leading and trailing edges of pit 103. When beam spot 104 impinges upon the center portion of the pit, the intensity of light reflected therefrom is approximately as great as the intensity of light which is reflected from the land, or surface of the record disc, surrounding the pit.

Figure 3:
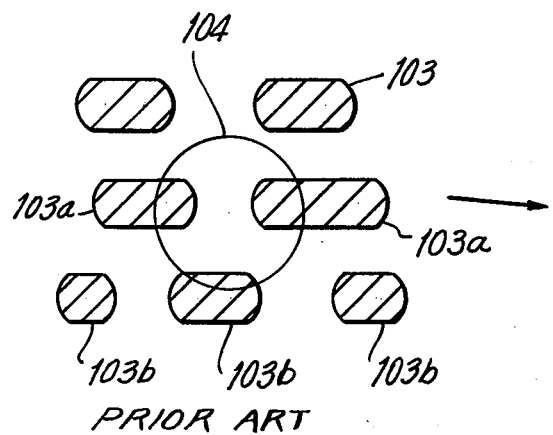
FIG. 3 illustrates the manner in which a beam spot of relatively large size scans the pits recorded on a record disc.

If beam spot 104 is too large, then the difficulties mentioned above, and represented in FIG. 3, may arise. In FIG. 3, the relationship between the length of a pit and the size of beam spot 104 may be proper for pits 103 and pits 103a. That is, when beam spot 104 scans pits 103 or its 103a, signals of the type shown in FIG. 2B may be produced representing each detected pit. However, when beam spot 104 scans, for example, left-most pit 103b, then the change in intensity of light which is reflected when this pit is scanned may be so small as to be undetectable. Hence, the improper relationship between the length of this pit and the size of beam spot 104 may result in an erroneous loss of information. Furthermore, beam spot 104 may be so large that when pits 103a are scanned, the beam spot also impinges upon a portion of a pit 103b in an adjacent track. This crosstalk due to the scanned pit in the adjacent track may reduce the intensity of the reflected light below a threshold level such that even though beam 104 scans the space between adjacent pits 103a, an output signal may be produced representing the detection of a pit.

It is appreciated that the aforenoted dufficulties described with respect to FIGS. 1-3 arise as a result of the dependence of the length of a pit with the radius of the track in which that pit is recorded. Because of this radial dependency, a proper relationship between the size of a reproducing beam spot and the length of a pit cannot be obtained merely by maintaining the size of the beam constant. The present invention avoids these difficulties by maintaining a constant length for each pit in each track relative to the radius of the track despite a change in the radius from one track to the next during recording. That is, even though the radius of an innermost track may be, for example, one third the radius of the outermost track, the pit recorded for a given frequency component in the innermost track will not be one third the length of the pit recorded for the same frequency component in the outermost track.

Figure 4A:
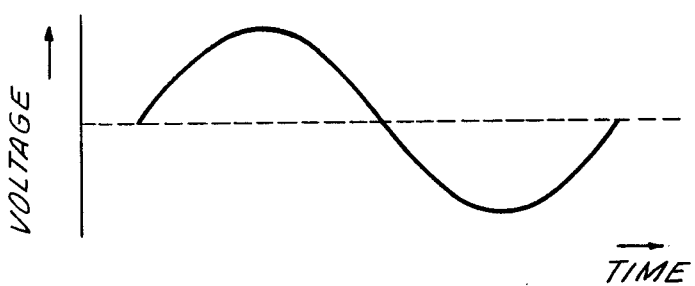
FIGS. 4A-4E are waveform diagrams which are useful in understanding the operation of the present invention.
Figure 4B:
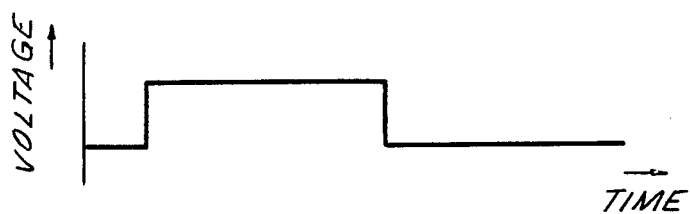
Figure 4C:
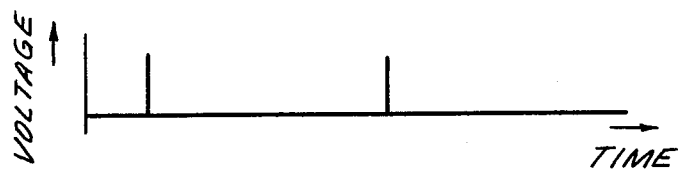
Figure 4D:
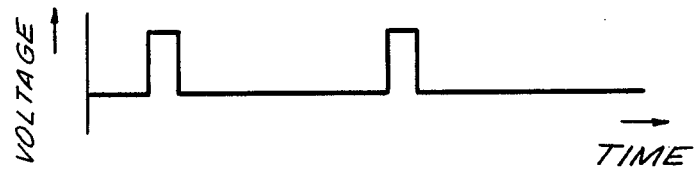
Figure 4E:
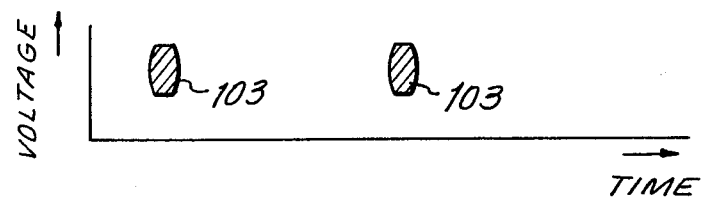

The principle which is adopted by the present invention can best be appreciated by referring to the waveform diagrams shown in FIGS. 4A-4E. Let it be assumed, for the purpose of the present discussion, that the information which is recorded is represented by a frequency modulated (FM) signal. One cycle of such an FM signal is shown in FIG. 4A. The broken line illustrated in FIG. 4A represents a reference level, such as a clipping level. When the FM signal crosses the reference level, a pulse is produced. Preferably, a pulse is produced both for positive and negative excursions of the reference level by the FM signal. Such pulses are shown in FIG. 4C. It is appreciated that, as the frequency of the FM signal increases, the separation between these pulses shown in FIG. 4C is reduced. Conversely, as the frequency of the FM signal decreases, this pulse separation increases. If each pulse is used to generate a rectangular pulse signal of constant duration, such as shown in FIG. 4D, then the separation between these rectangular pulses likewise is a representation of the frequency of the FM signal and, thus, represents the signal information. Stated otherwise, the duty cycle of the rectangular pulse, that is, the ratio of the positive pulse shown in FIG. 4D to the overall period, or cycle from one pulse to the next, may be used to represent signal information. If each pulse shown in FIG. 4D then is used to record a pit of correspondingly constant length, then the separation between adjacent pits is a representation of FM signal information. Hence, in one embodiment, the length of a pit is constant irrespective of the particular frequency component which is represented by that pit.

If the duration of each pulse shown in FIG. 4D is maintained constant from one track to the next, it is appreciated that, since the linear velocity of the inner tracks is less than the linear velocity of the outer tracks, the pits which are recorded on the inner tracks are shorter than the pits which are recorded in the outer tracks. This obtains for all frequency components if it is assumed that the duration of each pulse shown in FIG. 4D, and thus the length of each pit recorded in response thereto, is the same for all frequencies of the FM signal. To avoid this radial dependency of the pits in different tracks, the present invention proceeds by making the duration of the pulses shown in FIG. 4D larger when the innermost tracks are scanned and by reducing this duration when the outermost tracks are scanned.

Figure 5:
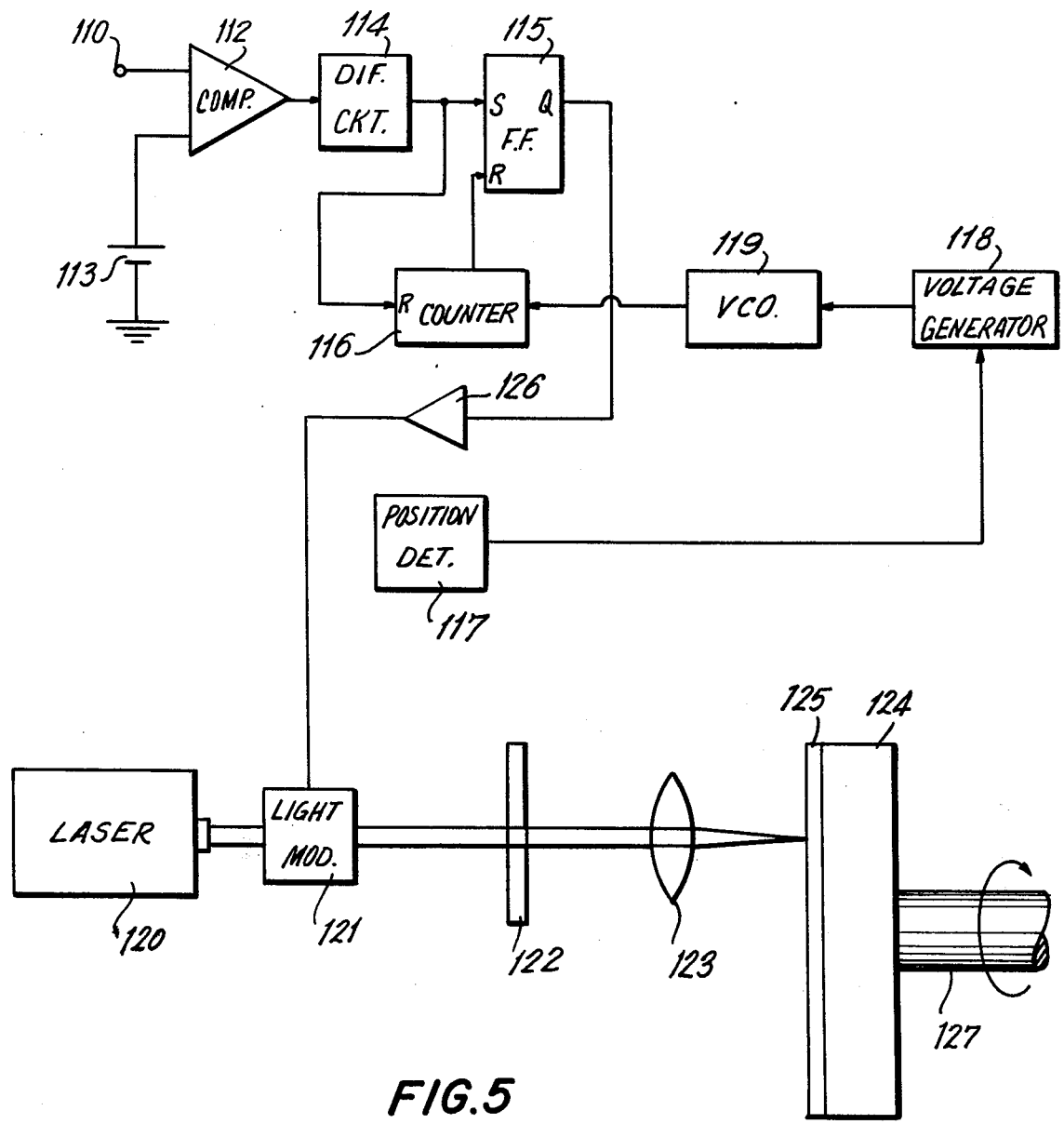
FIG. 5 is a block diagram of a preferred embodiment of this invention.

The apparatus which is used to carry out the present invention is shown as the block diagram in FIG. 5. The illustrated apparatus is comprised of a light source 120, a modulator 121, a compensator 122 and an optical focusing system 123. The purpose of light source 120, modulator 121, compensator 122 and focusing system 123 is to direct a modulated light beam onto the surface of a photoresponsive recording medium so as to record a series of pits of uniform length in substantially circular concentric tracks in the record medium. For this purpose, the record medium is a record disc formed of a photosensitive layer 125 deposited on a substrate 124. The record medium is rotated by a shaft 127 at a constant angular velocity, and an indexing mechanism (not shown) is used to advance the rotating shaft and rotating record medium in the radial direction such that the modulated light beam scans concentric circular tracks across the surface of photosensitive layer 125. It is appreciated that if the rotating record medium is advanced continuously in the radial direction, then the modulated light beam scans a substantially continuous spiral track. Alternatively, if the rotating record medium is advanced in the radial direction discontinuously, then the modulated light beam scans concentric circular tracks. For the purpose of the present discussion, and as used in the claims, the expression "substantially concentric circular tracks" is intended to refer to both embodiments. Since adjacent turns of the continuous spiral track are approximately circular, and are concentric, this expression is a close approximation of such a spiral track.

Preferably, light source 120 is a laser source for emitting a laser beam which is modulated in modulator 121 and to which photosensitive layer 125 is photoresponsive. As will be explained below, modulator 121 is capable of imparting an on-off modulation to the laser beam emitted by source 120. In one embodiment, the pit is recorded in the surface of photosensitive layer 125 when the laser beam is ON, and the surface of the photosensitive layer remains undisturbed when the laser beam is OFF.

As will be described, when an outer track is recorded on the record medium, the laser beam is ON for a shorter duration than when an inner track is recorded. Furthermore, the linear velocity of an outer track is greater than the linear velocity of an inner track. Consequently, the overall light density for recording on an outer track is less than the overall light density for recording on an inner track. To avoid subjecting photosensitive layer 125 to a greater photoreaction when an inner track is recorded than when an outer track is recorded, compensator 122 is provided. The purpose of this compensator is to provide a variable attenuation of the laser beam such that a greater attenuation is provided when an inner track is recorded than when an outer track is recorded. As an example, compensator 122 may comprise a neutral density filter.

Modulator 121, which may be an electro-optic modulator, an acousto-optic modulator, or the like, is controlled by pulse generating circuitry formed of a comparator 112, a differentiator 114, a bistate circuit 115, a counter 116, and a voltage controlled oscillator 119. Comparator 112 is coupled to an input terminal 110 to receive an FM signal, such as a frequency modulated video signal, and is adapted to detect when each cycle of the FM signal exceeds a reference level. In this regard, comparator 112 may comprise a differential amplifier-limiter and includes another input to receive a reference level, such as a level provided by a bias source 113. Comparator 112 is adapted to produce a rectangular pulse whose duration is equal to the duration of each cycle of the FM signal which exceeds the reference level established by source 113.

Comparator 112, which alternatively may be a Schmitt trigger, is coupled to a differentiator 114 which is adapted to generate narrow pulses at the positive and negative transitions of the rectangular pulse produced by comparator 112. Preferably, differentiator 114 includes polarity equalizing circuitry so that the narrow pulses produced thereby all are of the same polarity, such as positive polarity. Thus, it is seen that the combination of comparator 112 and differentiator 114 is adapted to function in a manner analogous to that of a zero-crossing detector, but with the zero level being replaced by the reference level established by source 113.

Differentiator 114 is coupled to bistate device 115 and, in addition, to a reset input of counter 116. Bistate device 115 may comprise, for example, a bistable multivibrator, such as a R-S flip-flop circuit whose set input is coupled to differentiator 114, as aforementioned, and whose reset input is coupled to the output of counter 116. As is conventional, bistate device 115 is adapted to respond to a signal applied to its set input, such as the narrow pulse produced by differentiator 114, to assume a first state, and is responsive to a signal applied to its reset input, such as an output signal produced by counter 116, to assume its second state. A Q output of bistate device 115 produces an output pulse whose duration is equal to the duration that the bistate device is in its first state. This pulse signal produced at the Q output of bistate device 115 is coupled via a buffer amplifier 126 to a modulating input of modulator 121.

Voltage controlled oscillator 119 is adapted to produce an oscillating signal whose frequency is controlled as a function of a control signal applied thereto. The output of voltage controlled oscillator 119 is coupled to counter 116, and the counter is adapted to count the number of cycles in the oscillating signal. When a preset number of cycles has been counted, counter 116 produces the aforementioned output signal which is applied to the reset input of bistate device 115. Thus, as the frequency of the oscillating signal produced by voltage controlled oscillator 119 varies, the time required for counter 116 to reach its preset count correspondingly varies. That is, as the frequency of the oscillating signal increases, the time required for counter 116 to reach its preset count decreases, thereby decreasing the duration of the pulse produced at the Q output of bistate device 115. Conversely, as the frequency of the oscillating signal produced by voltage controlled oscillator 119 decreases, the time required for counter 116 to reach its preset count increases, thereby increasing the duration of the pulse signal produced at the Q output of the bistate device.

In accordance with this invention, the frequency of the oscillating signal produced by voltage controlled oscillator 119 is controlled to vary as a function of the radius of the track being scanned. More particularly, when the innermost track is being scanned by the modulated laser beam, the frequency of the oscillating signal is a minimum such that the duration of the pulse produced at the Q output of bistate device 115 is a maximum. When the outermost track is being scanned by the modulated laser beam, the frequency of the oscillating signal is a maximum, thereby resulting in a minimum duration of the pulse produced at the Q output of the bistate device. This control over voltage controlled oscillator 119 is effected by a position detector 117 and a voltage generator 118. Position detector 117 is adapted to detect the radial position of the modulated laser beam that impinges upon the surface of photosensitive layer 125. The position detector may comprise an optical detector or, alternatively, may be coupled to the aforementioned indexing mechanism so as to produce an output signal which represents the radial position of the scanning laser beam. This output signal produced by position detector 117 is coupled to voltage generator 118 which is adapted to convert the position signal to a corresponding control voltage that is compatible with voltage controlled oscillator 119.

The functional operation of voltage generator 118 now will be described. Let it be assumed that the frequency of the oscillating signal produced by voltage controlled oscillator 119 is represented as f, the duration or width of the pulse produced at the Q output of bistate device 115 is represented as t, the angular velocity of the record medium is represented as $\omega$ and the voltage V generated by voltage generator 118, which is a function of the radial position r of the scanning laser beam, is represented as $V = g(r)$. With these assumptions, the frequency f of the oscillating signal produced by voltage controlled oscillator 119 is proportional to V such that $f = Kg(r)$, where K is a constant. If it is also assumed that counter 116 is adapted to produce an output signal upon reaching its preset count N, then the duration of the pulse produced at the Q output of bistate device 115 may be expressed as $t = N/f$.

Now, the length of a pit which is recorded in a track whose radius is r is a function of the angular velocity $\omega$ of the record medium, the radial position of the laser beam and the duration of the pulse which is used to modulate the laser beam, that is, to turn the beam ON. The length l of this pit may be expressed as $l = \omega r t$. In this expression for l, the equivalent expressions for t and f may be used such that $l = \omega r N/Kg(r)$. Since the length l of each pit is to be constant ($l = c$), then $g(r) = N/Kc \times r = kr$ where $k = N/Kc$.

Since $V = g(r)$, it is appreciated that voltage generator 118 may be implemented accordingly. As an example, voltage generator 118 may comprise an amplifier of constant gain k. As an alternative, the voltage generator may comprise an attenuating circuit having a constant attenuation K.

Figure 6A:
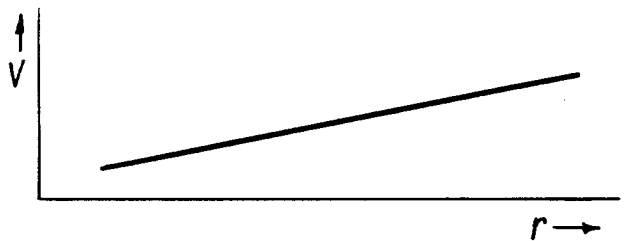
FIGS. 6A-6B are graphical representations which are useful in understanding the operation of this invention.
Figure 6B:
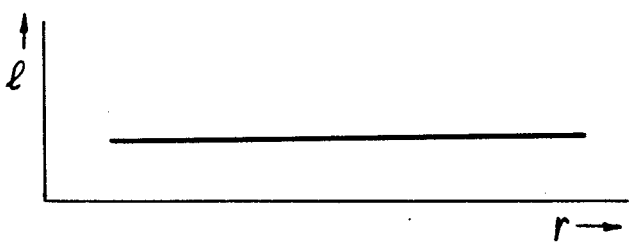

In accordance with this expression for the control voltage V applied to voltage controlled oscillator 119 by voltage generator 118, a graphical representation of the relation between the control voltage and the radial position r of the scanning laser beam may be as depicted in FIG. 6A. Thus, as the radial position of the scanning beam increases, the control voltage correspondingly increases so as to increase the frequency of the oscillating signal produced by voltage controlled oscillator 119. This, in turn, decreases the duration t of the pulse produced at the Q output of bistate device 115. Nevertheless, and as shown graphically in FIG. 6B, when this relationship is maintained, the length 1 of each pit remains constant notwithstanding an increase in the radius of the track being scanned.

The operation of the apparatus illustrated in FIG. 5 now will be described briefly with respect to the waveforms shown in FIGS. 4A-4E. The FM signal shown in FIG. 4A is applied to terminal 110 and is compared in comparator 112 to the clipping level represented by the broken line in FIG. 4A and produced by source 113. If the output stage of comparator 112 includes a Schmitt trigger, for example, then the pulse shown in FIG. 4B is produced for that portion of the FM signal which exceeds the clipping level. The positive and negative transitions of the pulse shown in FIG. 4B are differentiated by differentiator 114 resulting in the positive narrow pulses shown in FIG. 4C. As mentioned above, and as is now readily apparent, the separation between the pulses shown in FIG. 4C is a function of the frequency of the FM signal shown in FIG. 4A. As this frequency increases, the pulse separation is reduced; and as this frequency decreases, the pulse separation is increased.

The pulse produced by differentiator 114 sets bistate device 115 to its first state and, also, resets counter 116 to a reference count, such as zero. When the bistate device assumes its first state, a positive pulse is produced at its Q output, such as shown in FIG. 4D, and this pulse is applied by buffer amplifier 126 to modulator 121 so as to turn ON the laser beam which is transmitted to the surface of photosensitive layer 125 of the record disc. At this time, shaft 127 rotates so as to rotate the record disc.

Depending upon the radial position of the laser beam along the surface of the record disc, a corresponding signal representing that radial position is produced by position detector 117 and applied to voltage generator 118. The voltage generator supplies a control voltage V to voltage controlled oscillator 119 which is a function of the radial position r of the laser beam so as to correspondingly control the frequency of the oscillating signal produced by the voltage controlled oscillator. Counter 116, after being reset to its initial count, counts the number of cycles included in the oscillating signal supplied thereto until the preset, or predetermined count N is reached. At that time, counter 116 produces an output signal to reset bistate device 115 to its second state, thereby terminating the pulse produced at the Q output thereof, as shown in FIG. 4D. This turns OFF the laser beam and ends the recording of a pit 103 in the track.

During subsequent excursions of the clipping level by the FM signal, as shown in FIG. 4A, the foregoing operation is repeated such that a pit of constant length 1 is recorded in each track, notwithstanding the radial position of the scanning beam relative to the record disc. Hence, even though the beam scans a track whose radius differs from the preceding track, the length 1 of the pit recorded in the track being scanned is equal to the length 1 of all preceding pits. In this embodiment, pit length is independent of the radius of the track in which the pit is recorded and, in addition, pit length is independent of the frequency of the FM signal.

As is appreciated, after the photosensitive layer 125 is exposed to the modulated laser beam in the manner described above, the photosensitive layer is suitably developed and a master disc is produced. This master then can be employed for the mass production of large numbers of corresponding record discs, as by producing a mother and a stamper therefrom, in accordance with the usual techniques involved in the production of phonograph record discs.

When the teachings of the present invention are used to produce a record disc wherein information is represented by pits recorded in substantially concentric circular tracks, with all of the pits in all tracks having substantially the same length relative to the radii of the tracks notwithstanding that the radius of one track differs from the radius of another track, a signal reproduction operation can be achieved with minimum crosstalk and interference and with a good S/N ratio merely by maintaining the size of the reproducing scanning beam spot constant for all tracks. That is, by providing a constant pit length for all pits, an optimum relationship between the size of the pit and the size of the reproducing beam spot can be obtained relatively easily. Furthermore, this relationship will be constant throughout the scanning of all tracks merely by maintaining the size of the reproducing beam spot constant. Thus, the problem caused by a large pit relative to the size of the reproducing beam spot is avoided. Also, the problem caused by providing a beam spot whose size is much larger than the length of a pit, as mentioned above, also is avoided.

Figure 7A:
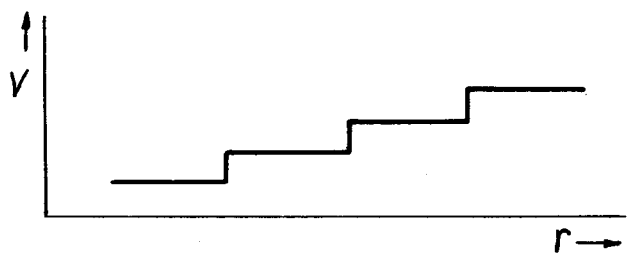
FIGS. 7A-7B are additional graphical representations which can be used in explaining the present invention.
Figure 7B:
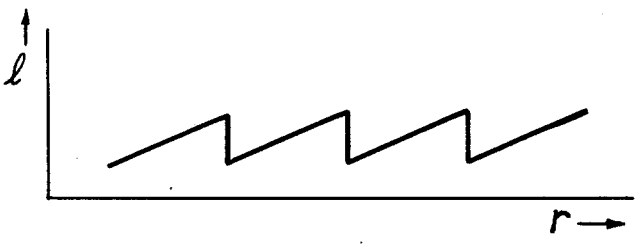

While the present invention has been particularly shown and described with reference to a preferred embodiment, it will be readily apparent that various changes and modifications in form and details may be made by one of ordinary skill in the art without departing from the spirit and scope of the invention. For example, although the illustrated apparatus is used to record FM signal information, it is appreciated that the spaced apart pits can be used to represent pulse width modulated (PWM) signal information. As another example, rather than advancing the rotating record medium while maintaining the laser beam fixed in order for the laser beam to scan concentric circular tracks across the surface of the record medium, the laser beam may be moved in the radial direction across the surface of the record medium. As a further example, the relationship between the voltage generated by voltage generator 118 and the radial position of the laser beam need not be limited solely to the relationship shown in FIG. 6A. Rather, the voltage generator may generate a staircase voltage signal corresponding to predetermined ranges of the radial position of the laser beam as such radial position varies. Such a staircase relationship between the voltage generated by voltage generator 118 and the radial position of the laser beam is shown in FIG. 7A. When this staircase waveform is used to control voltage controlled oscillator 119, the length of the pits which are recorded in the substantially concentric circular tracks varies slightly with the radial position of the laser beam as shown in FIG. 7B. However, this change in the length of the pits as a function of the radius of the track which is being scanned is minimal and does not result in the aforenoted problems attending prior art record discs. Furthermore, if the voltage generated by voltage generator 118, and thus the frequency of the oscillating signal produced by voltage controlled oscillator 119, varies in the form of a staircase waveform as shown in FIG. 7A, the limit over which the length of the pits in respective tracks can vary, as shown in FIG. 7B, is small enough such that signals which may be produced because of such pit-length changes can be suppressed. As yet another example, although the embodiment shown in FIG. 5 and the record carrier produced thereby has been described as having a constant pit-length irrespective of the frequency of the FM signal applied to input terminal 110, the teachings of the present invention also are applicable to a recording technique wherein the length of the pit is dependent upon the frequency component of the FM signal, or the width of a pulse of a PWM signal. Nevertheless, the length of the pit is maintained constant relative to the radius of the track in which it is recorded despite the change in the radius from one track to the next. However, since the radial dependency of pit-length can result in a much greater variation in the length of the recorded pits than the frequency dependency thereof, a variation in the length of the pits as a function of the FM component will not result in the aforenoted problems attending prior art record discs. As a numerical example, the center frequency of the FM signal is about 8 MHz, and the maximum frequency deviation of the FM signal is about 1.7 MHz. It is seen that the change in the length of a pit corresponding to the maximum frequency deviation is very small relative to the change in the length of a pit which is recorded in the innermost and outermost tracks. Hence, this small pit-length variation due to the frequency deviation of the FM signal can be neglected, especially when considering the relationship between the length of the pit and the size of the reproducing beam spot.

It is intended that the appended claims be interpreted as including the foregoing as well as various other such changes and modifications.

What is claimed is:

1. A method of recording information in substantially concentric circular tracks on a photoresponsive record carrier which is rotated at a constant angular velocity, comprising the steps of scanning said record carrier by a beam of light; modulating said light beam with an information signal to record spaced apart pits in each of said tracks, said spaced apart pits representing said information; and maintaining a constant length for each pit in each track relative to the radius of said track despite the change in the radius from one track to the next track being scanned.

2. The method of claim 1 wherein said step of modulating said light beam comprises generating rectangular pulse signals representing said information; and using said rectangular pulse signals to modulate said light beam.

3. The method of claim 2 wherein said step of maintaining a constant length for each pit comprises varying the duration of said rectangular pulse signals as a function of the radius of the track being scanned, such that as said radius is reduced said pulse duration is increased.

4. The method of claim 3 wherein said information is represented by the spacing between adjacent pits in a track.

5. The method of claim 3 wherein said information comprises frequency-modulated signals; and said step of generating rectangular pulse signals comprises establishing a reference level, comparing said frequency-modulated signals to said reference level, detecting the crossing points of said reference level by said frequency-modulated signals, and producing pulse signals at said detected crossing points.

6. The method of claim 5 wherein said step of varying the duration of said rectangular pulse signals comprises generating an oscillating signal; counting the cycles of said oscillating signal and producing an output when a predetermined number of cycles has been counted; varying the frequency of said oscillating signal as a function of said radius; and terminating the pulse signal which is produced at each detected crossing point in response to said output.

7. The method of claim 6 wherein the frequency of said oscillating signal is varied substantially continuously with said radius.

8. The method of claim 6 wherein the frequency of said oscillating signal is maintained constant at respective ranges of said radii and is varied when said radius changes from one range to the next range.

9. A rotatable record carrier upon which reproducible information is recorded in the form of spaced aart pits in at least one surface of said record carrier, said record carrier having substantially concentric circular tracks on said one surface, each track containing said spaced apart pits, and all of said pits having substantially the same length relative to the radii of said tracks notwithstanding that the radius of one track differs from the radius of another track.

10. The rotatable record carrier of claim 9 wherein the spacing between pits in a given track represents said information.

11. The rotatable record carrier of claim 10 wherein said information corresponds to frequency-modulated signals; and the length of all of said pits are the same irrespective of the frequency component represented by said pits.

12. The rotatable record carrier of claim 10 wherein said information is video information.

13. Apparatus for recording information onto a rotatable photoresponsive carrier comprising means for rotating said carrier; means for scanning substantially concentric circular tracks across a surface of said carrier with a light beam, said tracks having respective radii; means for generating rectangular pulse signals corresponding to said information; means for modulating said light beam with said rectangular pulse signals such that spaced apart pits are recorded in said tracks in accordance with the modulation of said light beam; and means for preventing the length of said pits in different tracks to vary as a function of the change in the radius from one track to the next track being scanned.

14. The apparatus of claim 13 wherein said means for preventing comprises means for changing the duration of said pulse signals as a function of track radius when said track radius changes between minimum and maximum levels such that the pulse duration is relatively high for a minimum track radius and is relatively low for a maximum track radius.

15. The apparatus of claim 14 wherein said means for generating rectangular pulse signals comprises means for receiving information signals; means responsive to said information signals for generating pulses whose separation is representative of said information; and means for generating a rectangular pulse signal of controllable pulse duration in response to each generated pulse.

16. The apparatus of claim 15 wherein said means for preventing comprises means for producing a position signal representing the radial position of said light beam; and means for controlling the pulse duration of said rectangular pulse signal as a function of said position signal.

17. The apparatus of claim 16 wherein said means for producing a position signal comprises voltage generating means for generating a voltage which varies substantially continuously as the radial position of said light beam varies.

18. The apparatus of claim 16 wherein said means for producing a position signal comprises a staircase generator of generating a staircase voltage signal corresponding to predetermined ranges of said radial position of said light beam as said radial position varies.

19. The apparatus of claim 16 wherein said means for controlling the pulse duration of said rectangular pulse signal comprises controllable oscillating means for generating an oscillating signal of variable frequency; counting means coupled to said oscillating means for counting the cycles of said oscillating signal and for generating an output signal when a predetermined number of cycles have been counted; means for applying said position signal to said oscillating means as a control signal therefor; and means for terminating each said pulse duration of said rectangular pulse signal in response to said output signal.

20. The apparatus of claim 19 wherein said information signals are frequency modulated signals; said means responsive to said information signals for generating pulses comprises comparator means for comparing said frequency modulated signals to a reference level and for generating pulses at each excursion of said frequency modulated signals across said reference level; and said means for generating a rectangular pulse signal comprises bi-state means responsive to a generated pulse for assuming a first state and responsive to said output signal for assuming a second state, and means for applying each generated pulse to said counting means for resetting said counting means to a pre-set count.

* * * * *